(12) United States Patent
Wu

(10) Patent No.: US 8,391,171 B2
(45) Date of Patent: Mar. 5, 2013

(54) METHOD AND SYSTEM FOR ADJUSTING CONFIGURATION OF BORDER OBJECT

(75) Inventor: Hao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 342 days.

(21) Appl. No.: 12/646,271

(22) Filed: Dec. 23, 2009

(65) Prior Publication Data

US 2010/0110925 A1 May 6, 2010

Related U.S. Application Data

(63) Continuation of application No. PCT/CN2008/071176, filed on Jun. 4, 2008.

(30) Foreign Application Priority Data

Jun. 29, 2007 (CN) .......................... 2007 1 0123534

(51) Int. Cl.
H04J 1/16 (2006.01)

(52) U.S. Cl. ........................................ 370/252; 370/310

(58) Field of Classification Search .................. 370/203, 370/229, 230, 230.1, 235, 310, 329, 332, 370/338, 328, 431, 443, 464, 509, 513; 455/422.1, 455/424, 436, 447, 446, 450, 443, 453, 456.1, 455/509, 513, 522; 709/223, 224
See application file for complete search history.

(56) References Cited

U.S. PATENT DOCUMENTS

| 7,489,934 | B2 * | 2/2009 | Li et al. ......................... | 455/453 |
|---|---|---|---|---|
| 7,570,956 | B2 * | 8/2009 | Bigham et al. ................ | 455/453 |
| 7,715,846 | B2 * | 5/2010 | Ji et al. .......................... | 455/447 |
| 2002/0110102 | A1 * | 8/2002 | Wei et al. ....................... | 370/335 |
| 2002/0173323 | A1 * | 11/2002 | Tateson ......................... | 455/509 |
| 2004/0114550 | A1 * | 6/2004 | Wei et al. ....................... | 370/320 |
| 2006/0111149 | A1 * | 5/2006 | Chitrapu et al. ........... | 455/562.1 |
| 2007/0008902 | A1 * | 1/2007 | Yaramada et al. ............ | 370/252 |
| 2007/0066334 | A1 * | 3/2007 | Butts et al. .................... | 455/522 |
| 2008/0130582 | A1 * | 6/2008 | Lee et al. ....................... | 370/332 |
| 2008/0134194 | A1 | 6/2008 | Liu | |
| 2008/0267109 | A1 * | 10/2008 | Wang et al. .................. | 370/312 |
| 2008/0280604 | A1 * | 11/2008 | Ore et al. ...................... | 455/424 |
| 2009/0069014 | A1 * | 3/2009 | Rune ............................ | 455/436 |

(Continued)

FOREIGN PATENT DOCUMENTS

| CN | 1787452 | 6/2006 |
|---|---|---|
| CN | 1819687 | 8/2006 |

(Continued)

OTHER PUBLICATIONS

3GPP TR 32.806 v7.0.0, Application guide for use of Integration Reference Points on P2P Interface, Jun. 2006, Release 7, pp. 1-12.*

(Continued)

Primary Examiner — Abdullah Riyami
(74) Attorney, Agent, or Firm — Slater & Matsil, L.L.P.

(57) ABSTRACT

The present disclosure relates to communication technologies and discloses a method for adjusting BO configuration and an EMS for use in a mobile communication network. The method includes: exchanging, by an Element Management System, EMS, information about BOs managed by other EMSs with each of the other EMSs; and negotiating with each of the other EMSs to adjust configuration of the BOs managed by each of the other EMSs according to the information about BOs received from the other EMSs. The embodiments of the present disclosure are applicable to adjustment and optimization of a BO in a mobile communication network.

10 Claims, 6 Drawing Sheets

U.S. PATENT DOCUMENTS

| | | | |
|---|---|---|---|
| 2009/0069023 A1* | 3/2009 | Ahn et al. | 455/450 |
| 2010/0048188 A1* | 2/2010 | Pucar Rimhagen et al. | 455/414.3 |
| 2010/0115090 A1* | 5/2010 | Petersen et al. | 709/224 |
| 2010/0278161 A1* | 11/2010 | Ore et al. | 370/338 |

FOREIGN PATENT DOCUMENTS

| | | |
|---|---|---|
| CN | 1835619 | 9/2006 |
| CN | 1917437 | 2/2007 |
| CN | 101335972 | 1/2012 |
| EP | 1830515 | 9/2007 |
| EP | 18300515 | 9/2007 |
| KR | 10-2005-0070917 | 7/2005 |
| WO | 98/15151 | 4/1998 |
| WO | 2004/019584 | 3/2004 |
| WO | WO 2006/015517 A1 | 2/2006 |
| WO | 2007/019805 | 2/2007 |
| WO | 2009/003382 | 1/2009 |

OTHER PUBLICATIONS

*Cooperative OSS Project (CO~OP) High Level Architecture*, Release 1.0, TMF058V1.0, Release 1, Version 1.0, TeleManagement Forum, Apr. 2005, pp. 1-180.

Written Opinion, mailed Sep. 11, 2008, in International Application No. PCT/CN2008/071176.

First Office Action, mailed Jan. 31, 2011, in Chinese Application No. 200710123534.3.

* cited by examiner

METHOD AND SYSTEM FOR ADJUSTING CONFIGURATION OF BORDER OBJECT

CROSS-REFERENCE TO RELATED APPLICATIONS

This application is a continuation of International Patent Application No. PCT/CN2008/071176, filed on Jun. 4, 2008, which claims priority to Chinese Patent Application No. 200710123534.3, filed on Jun. 29, 2007, both of which are hereby incorporated by reference in their entireties

FIELD OF THE DISCLOSURE

The present disclosure relates to communication technologies, and in particular, to a method for adjusting configuration of a Border Object (BO), and an Element Management System (EMS).

BACKGROUND

The operation of a mobile communication network requires a powerful operation support system which provides comprehensive management. The operation support system of a communication network primarily includes: a billing system, a network monitoring and management system, and a customer management system. The network monitoring and management system monitors and analyzes the operation state of the network in real time, discovers, locates and handles various faults in the network, and adjusts the network configuration to meet the requirements of different users. A mobile communication network needs to be capable of flexible and dynamic adjustment due to mobility of users.

The dynamic adjustment of a network is based on performance statistics, especially the network-related Key Performance Identification (KPI) data. Such data reflects the current operation states (overloaded, idle) of the components of the network. Through analysis on such data, the overall operation conditions of the network are grasped, and the network configuration can be optimized accurately.

The network operation support management system in the prior art is hierarchical, where the Network Management System (NMS) may be made up of multiple specialized systems such as integrated fault management system, integrated performance management system, and integrated resource management system. Each NMS manages multiple peer EMSs. Each EMS manages multiple Managed Elements (MEs). The EMS collects performance statistics from each ME, aggregates the performance statistics and reports them to the NMS. The NMS analyzes the statistics comprehensively to discover possible problems of the network and perform the corresponding operations.

FIG. 1 shows a management hierarchy of a mobile communication network in the prior art. The NMS in FIG. 1 manages only two EMSs (EMS1 and EMS2). In practice, an NMS may manage multiple EMSs.

Cells are the most important basic network elements in a mobile communication network, and important MEs in the EMS. Important parameters such as transmitting power, transmitting radius, and transmitting angle of the cell need to be optimized. Such optimization brings direct impact on the communication quality of the users covered by the cell and the users covered by the neighboring cells. For example, after the transmitting power of a cell is increased, the users covered by the neighboring cells are easier to hand over to this cell. Therefore, before the transmitting power of a cell is increased, it is necessary to consider whether the effect of the handover is desired, or consider whether the transmitting power of the neighboring cells needs also to be adjusted.

If a cell and its neighboring cells are managed by the same EMS, most mobile communication networks in the prior art can analyze the cell data within the EMS, adjust the cell parameters, and optimize the cell configuration. In the prior art, if two or more neighboring cells are managed by different EMSs, namely, if two or more cells are Border Objects (BOs) of different EMSs, each EMS collects the performance statistics of the managed BOs and then reports them to the upper-layer NMS. The performance statistics of all the relevant BOs are analyzed within the upper-layer NMS. The upper-layer NMS delivers the configuration adjustment scheme of each BO to the corresponding EMS, and the EMS adjusts the configuration of BOs of this EMS.

In the process of implementing the present disclosure, the inventor finds at least the following technical defects in the prior art:

In the prior art, the mobile communication network adjusts and optimizes the BOs in a complicated process which includes: The EMS collects data, the relevant EMSs report the data to the NMS, the NMS analyzes the data, and the NMS delivers optimization commands to the relevant EMSs according to the analysis results and monitors the optimization effect. Consequently, the process of optimizing the BO is long, the mobile communication network is unable to respond to some abrupt events, or adjust the network performance quickly, or finish network optimization in time, which brings a bottleneck of further enhancing the network Quality of Service (QoS).

SUMMARY

A method for adjusting BO configuration and an EMS are disclosed in an embodiment of the present disclosure to optimize the BO configuration in the mobile communication network quickly.

A method for adjusting BO configuration is disclosed herein. The method includes: exchanging, by an EMS, information about BOs managed by other EMSs with each of the other EMSs; and negotiating with each of the other EMSs to adjust configuration of the BOs managed by each of the other EMSs according to the information about BOs received from the other EMSs.

An EMS is disclosed herein. The EMS includes an interface and the following units: a sending unit, configured to send information about BOs managed by the EMS to other EMSs; a receiving unit, configured to receive information about BOs managed by other EMSs and send the information to a configuration management unit; and the configuration management unit, configured to perform configuration adjustment for neighboring cells which are managed by the other EMSs and adjacent to the BOs managed by the EMS, according to the information about the BOs managed by the other EMSs received by the receiving unit.

In the embodiments of the present disclosure, the EMS obtains the performance statistics of a managed BO, and negotiates with the peer EMS that covers the neighboring cell adjacent to the BO and not managed by the same EMS when the performance statistics meet the preset negotiation conditions. According to the negotiation result, the peer EMS adjusts the configuration for the neighboring cell (namely, the BO of the peer EMS) to optimize the configuration. In the adjustment process in the prior art, each EMS needs to report the performance statistics of the managed BOs, and the NMS analyzes the performance statistics of all relevant BOs and delivers a BO configuration adjustment solution to the relevant EMSs. Compared with the prior art, the embodiments of the present disclosure relieve the workload of the upper-layer NMS and quicken optimization of cell configuration significantly so that the mobile communication network can better respond to abrupt events and improve QoS.

DETAILED DESCRIPTION

The method for adjusting BO configuration is detailed below by reference to accompanying drawings and some exemplary embodiments.

Embodiment 1

Figure 1:
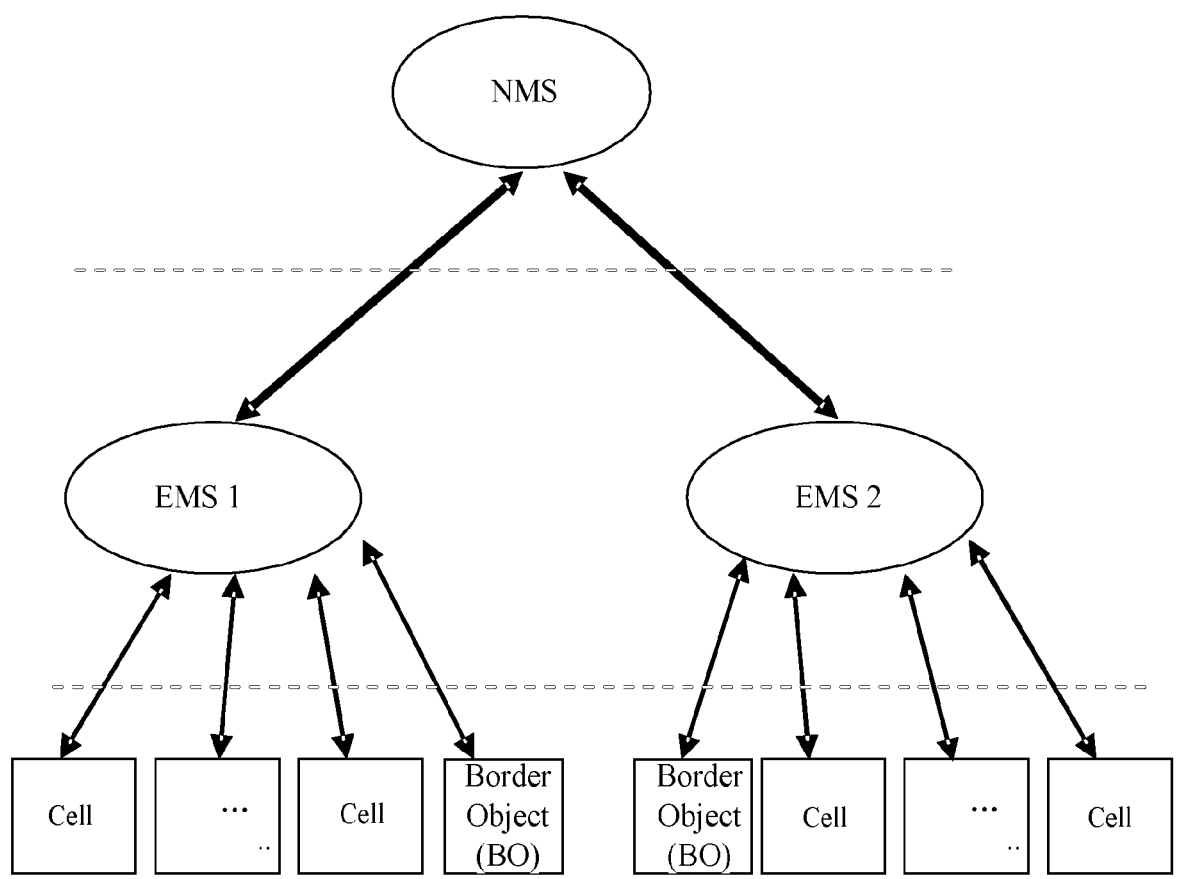
FIG. 1 shows a management hierarchy of a mobile communication network in the prior art.
Figure 2:
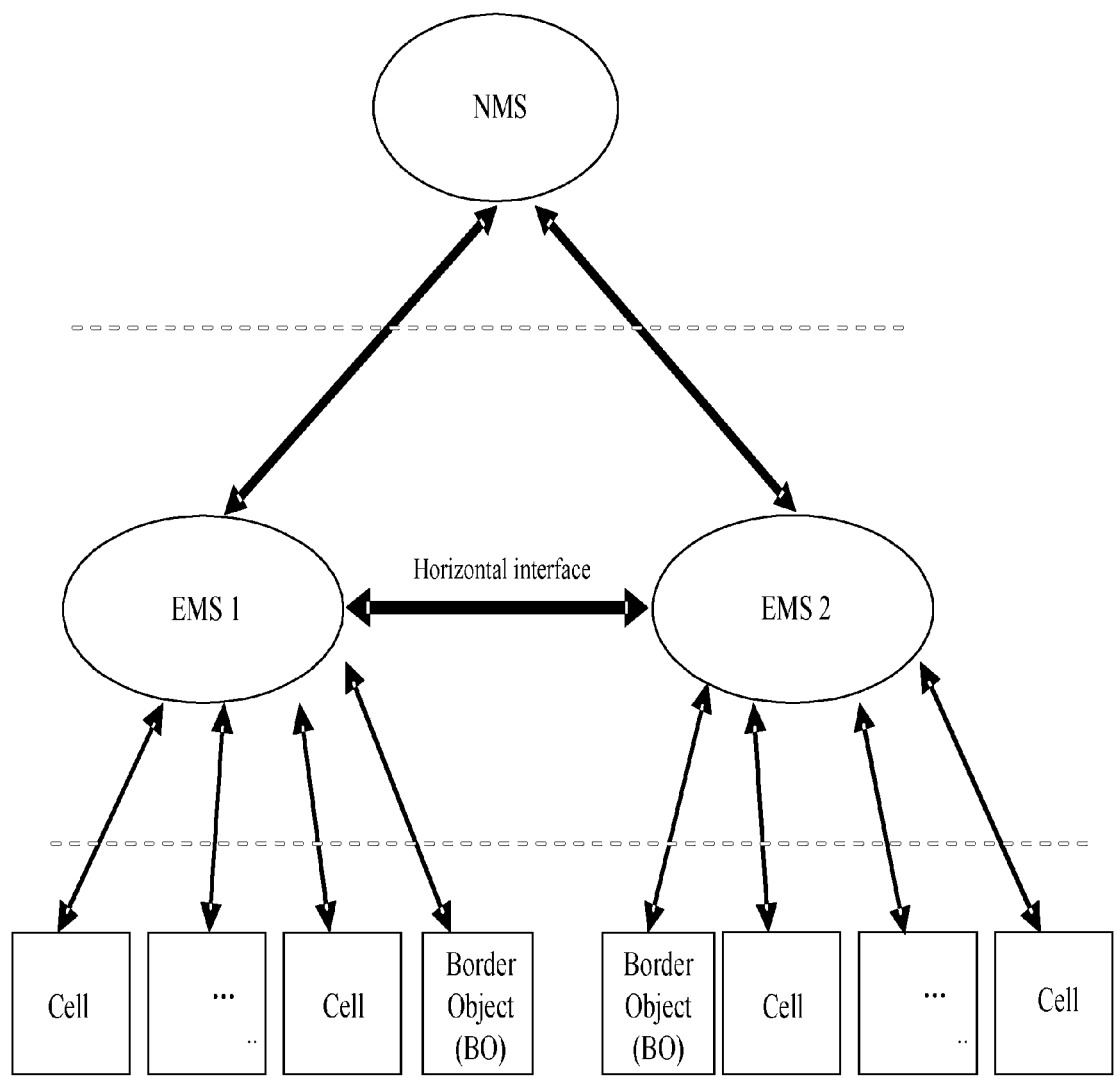
FIG. 2 shows management architecture of a mobile communication network according to an embodiment of the present disclosure.

FIG. 2 shows management architecture of a mobile communication network according to the first embodiment of the present disclosure.

As shown in FIG. 2, for the EMSs in which the BO of one EMS is adjacent to the BO of another EMS, a connection is set up between such EMSs through a horizontal interface. Each EMS obtains the performance statistics of the BO managed by this EMS, and negotiates through the horizontal interface with the peer EMS that covers the neighboring cell not managed by the same EMS when the performance statistics of a BO meet the negotiation conditions in the preset adjustment polices. The peer EMS that covers the neighboring cell adjusts the configuration for the neighboring cell.

In the first embodiment and the following embodiments, peer EMSs refer to the EMSs that are located on the same hierarchical level in the network operation support management system of the existing technical hierarchy and have the same or similar structures and functions. Multiple peer EMSs can share the performance statistics of the managed BOs through a horizontal interface, negotiate configuration adjustment of relevant BOs, and optimize configuration for the relevant BOs. In the first embodiment and the following embodiments, neighboring cells refer to the BOs which are managed by different EMSs and have geographical coverage adjacent to each other. For example, supposing that the performance statistics of border object A managed by EMS1 meet the negotiation conditions, the neighboring cell of border object A refers to the cell that is not managed by the EMS1 and has geographical coverage adjacent to cell A. Supposing that three cells (cell B, cell C, cell D) are adjacent to border object A, cell B and cell C are managed by EMS2, and cell D is managed by EMS3, cell B, cell C, and cell D are neighboring cells of border object A, and the neighboring cells are managed by two EMSs: EMS2 and EMS3. Meanwhile, each neighboring cell is a BO of the EMS that manages the neighboring cell.

Especially, one EMS has multiple peer EMSs. That is, one EMS may be adjacent to multiple EMSs, and may set up horizontal interfaces with multiple adjacent EMSs only if the BO managed by this EMS is adjacent to the BOs managed by the multiple EMSs.

The NMS shown in FIG. 2 manages two EMSs, namely, EMS1 and EMS2, either of which manages multiple cells and BOs. EMS1 and EMS2 have a geographically adjacent BO, and are connected through a horizontal interface to negotiate the configuration adjustment of the relevant BOs.

In the first embodiment, the NMS manages two EMSs (EMS1 and EMS2) connected through an interface. In practice, one NMS may manage multiple EMSs, and the EMSs can be connected through the horizontal interface only if adjacent BOs exist. The quantity of interconnected EMSs is not limited.

Examples are given below to describe how to optimize the configuration of relevant BOs through negotiation between EMSs.

Embodiment 2

Figure 3:
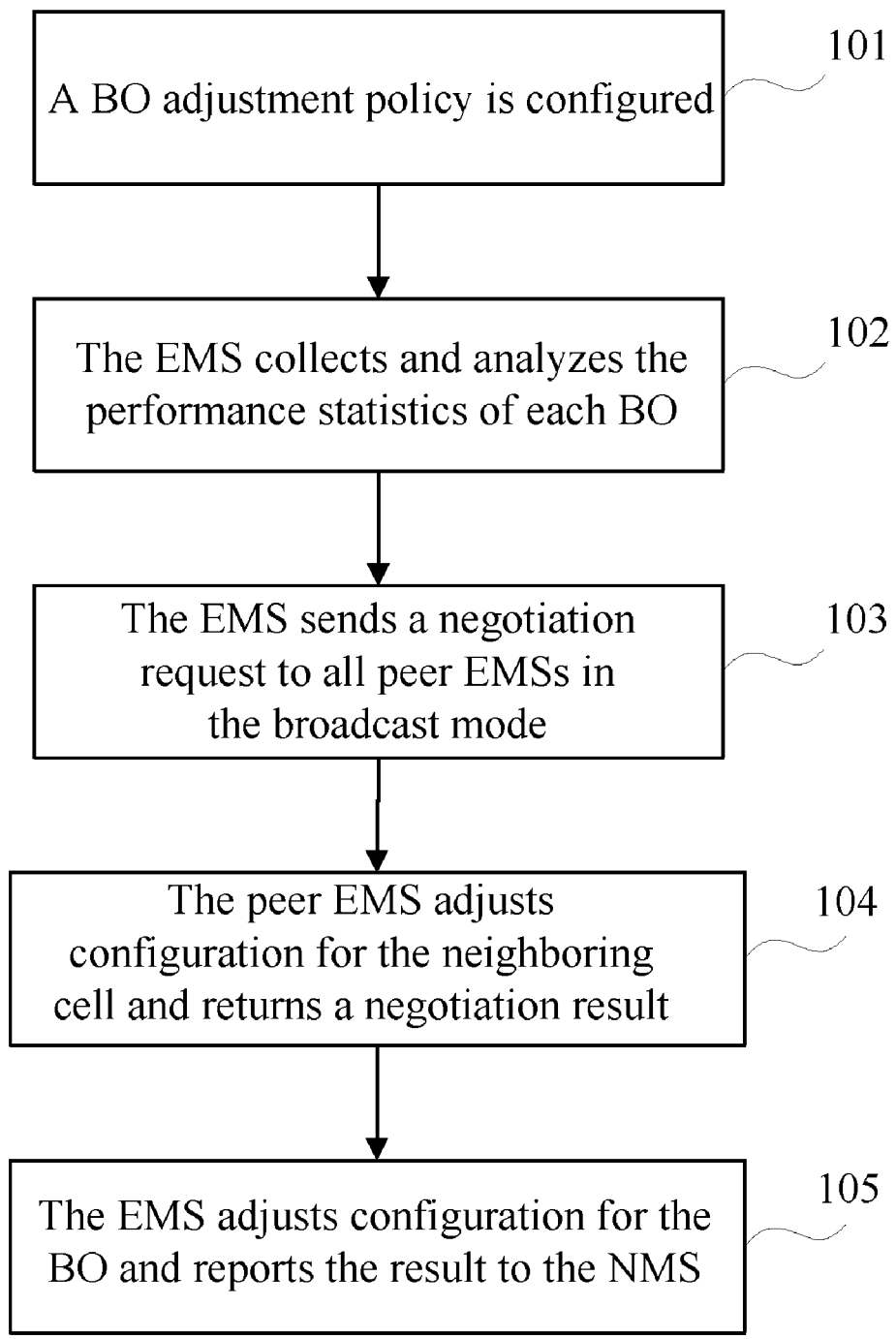
FIG. 3 is a first flowchart of adjusting BO configuration according to an embodiment of the present disclosure.

FIG. 3 shows a process of adjusting BO configuration according to the second embodiment of the present disclosure. The process includes the following blocks:

Block 101: A BO adjustment policy is configured.

The BO adjustment policy may be configured by the upper-layer NMS or other systems, and may be stored in each EMS.

Meanwhile, the upper layer needs to deliver the data about the neighboring cell of the corresponding BO, or configure the data in each EMS, for example, identifier of neighboring cell, and identifier of the peer EMS of the neighboring cell.

The BO adjustment policy may include but is not limited to the following information:

(1) Conditions of starting negotiation with the peer EMS about BO configuration adjustment (the peer EMS hereinafter refers to the EMS that manages the neighboring cell). For example, the negotiation condition is: The KPI data of a BO reveals that the traffic of the BO reaches a threshold value, or the call failure ratio of a BO within a time segment exceeds the threshold.

(2) Policy of selecting a peer EMS. The selection policy comes in many types. In the second embodiment, the selection policy is: The EMS sends negotiation requests to all peer EMSs in a broadcast mode.

(3) Processing method applied by the peer EMS after the negotiation request is received. Processing methods come in many types, and correspond to the starting conditions respectively. Starting conditions include: The performance statistics (such as current traffic and call completion ratio) of the neighboring cell meets the set threshold. Each processing method may specify the type and the value range of the configuration parameters. For example, after receiving the negotiation request, if the peer EMS determines that the first processing method is applicable according to the current performance statistics of the managed neighboring cell, the peer EMS performs the operations involved in the first processing method to adjust and update the relevant configuration parameters of the neighboring cell.

Block 102: The EMS collects and analyzes the performance statistics of each managed BO. That is, the EMS collects and analyzes the KPI data of the BO. Such KPI data reflects the QoS of the BO. Such KPI data includes but is not limited to: call traffic of the BO within a statistic period, call completion ratio of the BO, and ratio of various failure causes.

Block 103: The EMS sends a negotiation request to all peer EMSs in the broadcast mode.

In block 103, according to the KPI data analysis result of the managed BO, the EMS determines whether the negotiation condition in the adjustment policy is fulfilled, and thus decides whether to start negotiation with the peer EMS.

In practice, the corresponding threshold of the KPI data may be set as a negotiation condition. When the KPI data of the BO reaches the set threshold, the negotiation condition is determined as fulfilled, and the negotiation with the peer EMS is started.

According to one of the peer EMS selection policies included in the stored adjustment policies, the EMS sends a negotiation request to all peer EMSs in the broadcast mode.

Specially, the EMS may adjust the configuration for the managed BO before sending the negotiation request. After completing the configuration adjustment, the EMS may send a negotiation request to all the peer EMSs that manage the neighboring cell in the broadcast mode, requesting the peer EMSs to adjust the configuration for the neighboring cell.

The information carried in the negotiation request includes but is not limited to: identifier of the BO managed by the EMS, KIP analysis result of the managed BO, identifier of the EMS that manages the neighboring cell, identifier of the neighboring cell, and configuration adjustment operations proposed for the neighboring cell.

Block 104: After receiving the negotiation request, the peer EMS analyzes the KPI data of the managed neighboring cell and the current configuration parameters, and determines whether the proposed adjustment operations are applicable to the neighboring cell according to the processing method subsequent to receiving of the negotiation request stored in the adjustment policy. If the proposed adjustment operations are applicable, the peer EMS performs the proposed configuration adjustment for the neighboring cell, and then returns a negotiation result indicative of performing configuration adjustment to the EMS, or else returns a negotiation result indicative of rejecting configuration adjustment to the EMS.

The following blocks according to this embodiment are optional.

Block 105: When an EMS receives the negotiation result indicative of performing configuration adjustment from one or more peer EMSs, the EMS obtains the current performance statistics of the managed BO again, and determines whether the performance statistics fulfill the negotiation condition. If the performance statistics fulfill the negotiation condition, the EMS sends a report message to the NMS, reporting the current performance statistics of the managed BO to the NMS for processing.

Especially, if all peer EMSs return a negotiation result indicative of rejecting configuration adjustment, or if no negotiation result is received within the preset period, the EMS reports the KPI of the managed BO and the result of negotiating with the peer EMSs to the upper-layer NMS. The upper-layer NMS performs configuration adjustment according to the overall operation conditions of the network. The process is ended.

Especially, the EMS adjusts the BO managed by the EMS itself before sending the report message to the NMS.

Especially, the EMS adjusts its BO when the peer EMS adjusts the neighboring cell simultaneously, or consecutively.

The foregoing process may also include: The EMS and the peer EMS report the adjusted BO configuration information to the NMS, and record their own BO configuration adjustment logs.

Embodiment 3

Figure 4:
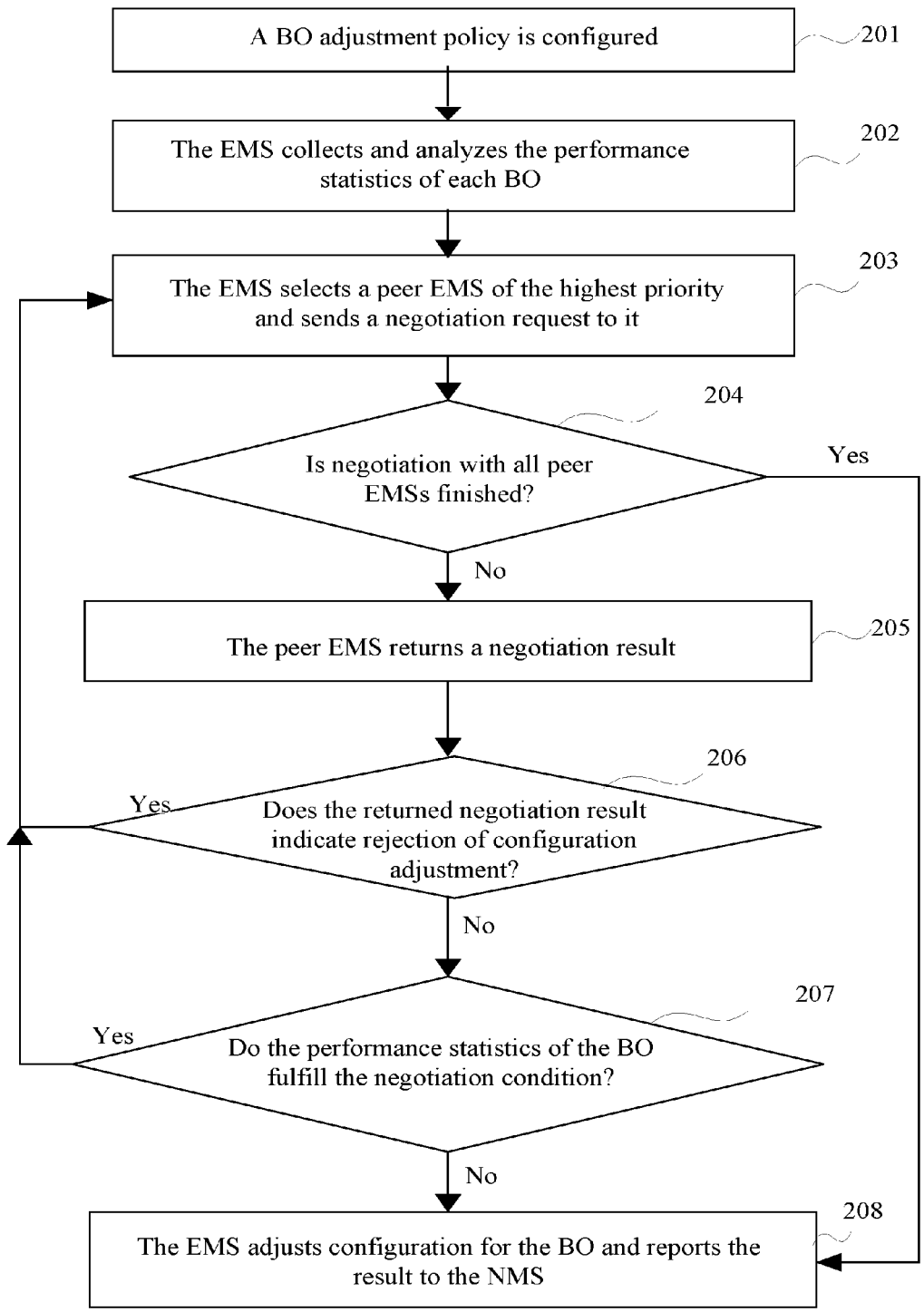
FIG. 4 is a second flowchart of adjusting BO configuration according to an embodiment of the present disclosure.

FIG. 4 shows a process of adjusting BO configuration according to the third embodiment of the present disclosure. The process includes the following blocks:

Block 201: This block is the same as block 101 in the second embodiment, and is not repeated here any further.

Block 202: This block is the same as block 102 in the second embodiment, and is not repeated herein any further.

Block 203: The EMS compares the priority of the peer EMSs, and selects the peer EMS of the highest priority and sends a negotiation request to the selected peer EMS.

In block 203, according to the KPI data analysis result of the managed BO, the EMS determines whether the negotiation condition in the adjustment policy is fulfilled, and thus decides whether to start negotiation with the peer EMS.

In practice, the corresponding threshold of the KPI data may be set as a negotiation condition. When the KPI data of the BO reaches the set threshold, the negotiation condition is determined as fulfilled, and the negotiation with the peer EMS is started.

Before starting negotiation with the peer EMSs, the EMS selects the peer EMS of the highest priority according to the peer EMS priority stored in the adjustment policy, and sends a negotiation request to the selected peer EMS.

The information carried in the negotiation request includes but is not limited to: identifier of the BO managed by the EMS, KIP analysis result of the managed BO, identifier of the EMS that manages the neighboring BO, identifier of the neighboring BO, and configuration adjustment operations proposed for the neighboring BO.

Block 204: A determination is made about whether the negotiation with the peer EMSs are completed. If the negotiation is completed, the process proceeds to block 208; otherwise, the process proceeds to block 205.

Block 205: The peer EMS analyzes the KPI data of the managed neighboring cell and the current configuration parameters, and determines whether the proposed adjustment operations are applicable to the neighboring cell according to the processing method subsequent to receiving of the negotiation request stored in the adjustment policy. If the proposed adjustment operations are applicable, the peer EMS performs the proposed configuration adjustment for the neighboring cell, and then returns a negotiation result indicative of performing configuration adjustment to the EMS, or else returns a negotiation result indicative of rejecting configuration adjustment to the EMS. The process proceeds to block 206.

Block 206: The EMS determines whether a negotiation result indicative of rejecting configuration adjustment is received, or whether no negotiation result is returned within the set period. If such is the case, the process returns to block 203, where the EMS goes on selecting the next peer EMS of the highest priority to which a negotiation result needs to be sent. If the EMS receives a negotiation result indicative of performing configuration adjustment, the process proceeds to block 207.

Block 207: The EMS obtains the current performance statistics of the managed BO again, determines whether the performance statistics fulfill the negotiation condition: if the negotiation condition is still fulfilled, the process proceeds to block 203, where the EMS selects the next peer EMS of the highest priority to which a negotiation request needs to be sent; otherwise, the process proceeds to block 208.

Block 208: The EMS reports the KPI of the managed BO and the result of negotiation with the peer EMS to the upper-layer NMS, and the upper-layer NMS performs configuration adjustment according to the overall operation conditions of the network. The process is ended.

Especially, the EMS adjusts the BO managed by the EMS itself before sending the report message to the NMS.

The foregoing process may also include: The EMS and the peer EMS report the adjusted BO configuration information to the NMS, and record their own BO configuration adjustment logs.

In block 203, the priority of all the peer EMSs may be configured statically. For example, the highest priority is set for the peer EMSs of one manufacturer, and the higher priority is set for the peer EMSs of other manufacturers in favorable cooperation. Alternatively, the priority is predefined for all the peer EMSs.

Especially, the EMS may dynamically determine the order of priority for all the peer EMSs, as exemplified below:

Before sending the negotiation request, the EMS obtains the performance statistics of the corresponding neighboring cell from each peer EMS through a horizontal interface connected to the peer EMSs. According to the performance statistics of each neighboring cell, the EMS analyzes and determines the order of priority of the neighboring cells that need configuration adjustment. That is, neighboring cells are arranged according to the possibility of configuration adjustment operations for the neighboring cells, and the priority order of the neighboring cells serves as the priority order of the peer EMSs. The performance statistics of the neighboring cells is time-varying. Therefore, the priority of the peer EMSs is also variable. The EMS sends a negotiation request to the peer EMS according to the dynamically determined priority order. Therefore, it is more possible that the requested peer EMS performs configuration adjustment for its neighboring cells, thus quickening optimization of the BO configuration.

It is understandable to those skilled in the art that all or part of the blocks of the foregoing embodiments may be implemented through hardware instructed by a program. The program may be stored in a computer-readable storage medium such as ROM/RAM, magnetic disk, and compact disk.

Embodiment 4

Figure 5:
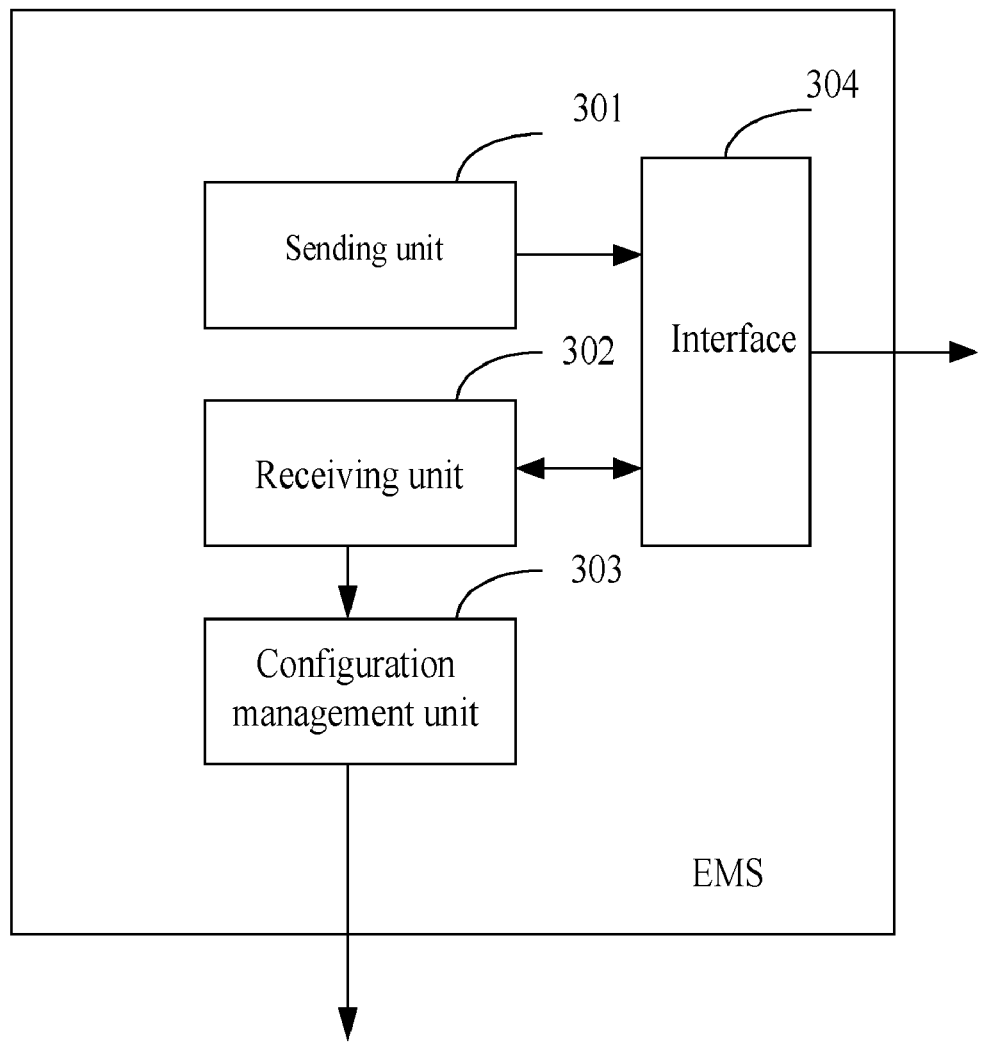
FIG. 5 is a first schematic diagram of an EMS structure according to an embodiment of the present disclosure.

FIG. 5 shows a structure of an EMS according to the fourth embodiment of the present disclosure.

An EMS provided in the fourth embodiment includes an interface 304 and the following units:

a sending unit 301, configured to send the information about the managed BOs to other EMSs through an interface 304;

a receiving unit 302, configured to receive the information about the BOs from other EMSs through the interface 304 and send the information to a configuration management unit 303; and a configuration management unit 303, configured to adjust the configuration for the neighboring cells that are managed by this EMS and adjacent to the BOs according to the information about the BOs of other EMSs received by the receiving unit 302.

Embodiment 5

Figure 6:
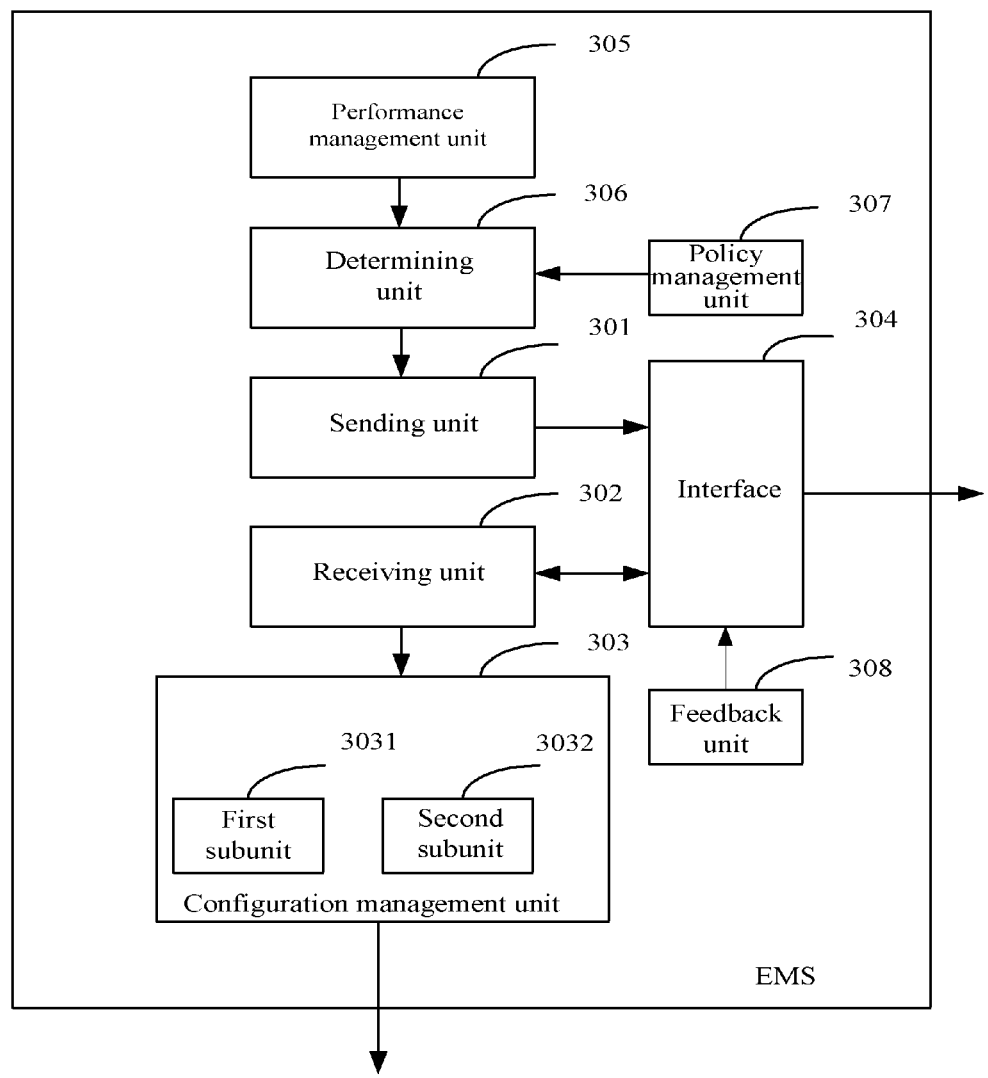
FIG. 6 is a second schematic diagram of an EMS structure according to an embodiment of the present disclosure.

FIG. 6 shows a structure of an EMS according to the fifth embodiment of the present disclosure.

On the basis of the EMS provided in the fourth embodiment, the EMS provided in the fifth embodiment further includes: a performance management unit 305, a determining unit 306, a policy management unit 307, and a feedback unit 308.

The performance management unit 305 is configured to obtain the performance statistics of the managed BO and send them to the determining unit 306.

The determining unit 306 is configured to: determine whether the performance statistics of the BO fulfill the negotiation condition stored in the preset adjustment policy; and, if the performance statistics of any BO fulfill the negotiation condition, send the information about this BO to the sending unit 301.

The sending unit 301 is configured to: send a negotiation request through an interface 304 to the EMS that manages the neighboring cell geographically adjacent to the BO and managed by a different EMS, where the request carries the PO information.

The policy management unit 307 is configured to configure and store adjustment policies, where an adjustment policy includes at least: negotiation condition, and processing policy kept after receiving a negotiation request.

The determining unit 306 obtains the stored negotiation condition from the policy management unit 307.

The configuration management unit 303 is configured to obtain, from the policy management unit 307, a stored processing policy kept after receiving a negotiation request.

The adjustment policy configured and stored in the policy management unit 307 includes but is not limited to the following information:

data about the neighboring cell of the EMS BO, for example, identifier of the neighboring cell, and identifier of the peer EMS of the neighboring cell;

condition of starting negotiation with the peer EMS about BO configuration adjustment. For example, the negotiation condition is: The KPI data of a BO reveals that the traffic of the BO reaches a threshold value, or the call failure ratio of a BO within a time segment exceeds the threshold;

policy of selecting a peer EMS; and processing method applied by the peer EMS after a negotiation request is received.

Specially, the policy management unit 307 may be set in an EMS or an NMS.

The feedback unit 308 is configured to return negotiation result information through a horizontal interface 304 after receiving a negotiation request from other EMSs.

Especially, the configuration management unit 303 includes a first subunit 3031 and a second subunit 3032.

The first subunit 3031 is configured to: determine whether to perform configuration adjustment for the neighboring cell according to the BO information of other EMSs received by the receiving unit 302 and according to a processing policy kept after receiving a negotiation request, where the processing policy is stored in the adjustment policy; if determining that configuration adjustment is required, notify the second subunit 3032.

The second subunit 3032 is configured to perform configuration adjustment for the neighboring cell.

In this embodiment, the performance management unit 305, the determining unit 306, the policy management unit 307, and the feedback unit 308 may be set in separate EMSs, or set jointly in one EMS to obtain a better EMS.

To sum up, in the embodiments of the present disclosure, an EMS negotiates with the peer EMSs to optimize the BO configuration. Compared with the BO configuration adjustment solution in the prior art which requires complicated adjustment control, the embodiments of the present disclosure relieve the workload of the upper-layer NMS and quicken optimization of BO configuration significantly so that the mobile communication network can better respond to abrupt events and improve QoS.

It is apparent that those skilled in the art can make various modifications and variations to the present disclosure without departing from the spirit and scope of the present disclosure. The present disclosure is intended to cover such modifications and variations provided that they fall in the scope of protection defined by the following claims or their equivalents.

What is claimed is:

1. A method for adjusting configuration of a border object (BO), comprising:
   exchanging, by an Element Management System (EMS), information about BOs managed by other EMSs with each of the other EMSs; and
   negotiating with each of the other EMSs to adjust configuration of the BOs managed by each of the other EMSs according to the information about BOs received from the other EMSs;
   wherein before the exchanging of information about BOs managed by the other EMSs, the method further comprises:
      obtaining, by the EMS, performance statistics of BOs of the EMS managed by the EMS;
      determining, by the EMS, whether the performance statistics of the BOs of the EMS meet negotiation conditions in preset adjustment policies; and
      when the performance statistics of any BO of the EMS meet the negotiation conditions in the preset adjustment policies, sending, by the EMS, the information about the BO to the other EMSs which manage neighboring cells which are adjacent to the BO of the EMS and not managed by the EMS.

2. The method according to claim 1, wherein the sending of the information about the BO of the EMS comprises:
   sending a negotiation request which comprises the information about the BO of the EMS.

3. The method according to claim 2, wherein the negotiation request comprises analysis result of performance statistics, an identifier of the BO of the EMS, an identifier for each of other EMSs which manage the neighboring cells, an identifier for each of the neighboring cells, and configuration adjustment operations proposed for the neighboring cells.

4. The method according to claim 3, wherein after sending the information about the BO of the EMS, the method further comprises:
   receiving, by each of the other EMSs which manage the neighboring cells, the negotiation request;
   determining whether to perform configuration adjustment for the neighboring cells according to a processing policy kept after receiving a negotiation request in the adjustment policies;
   sending, a negotiation result indicative of performing configuration adjustment or a negotiation result indicative of rejecting configuration adjustment to the EMS which sends the negotiation request.

5. The method according to claim 2, wherein the adjustment policies further comprise EMS selection policy, and the sending a negotiation request comprises:
   sending the negotiation request to each of the other EMSs which manage the neighboring cells in broadcast mode according to the EMS selection policy;
   selecting a EMS with the highest priority from the other EMSs which manage the neighboring cells; and
   sending the negotiation request to the selected EMS.

6. The method according to claim 5, further comprising:
   configuring statically the order of the priority of the other EMSs which manage the neighboring cells, or
   determining dynamically the order of the priority of the other EMSs which manage the neighboring cells.

7. The method according to claim 6, wherein the determining dynamically the order of priority of the other EMSs which manage the neighboring cells comprises:
   obtaining the performance statistics of the neighboring cells from each of the other EMSs which manage the neighboring cells;
   analyzing and determining the order of priority of the neighboring cells according to the performance statistics of the neighboring cells; and
   the order of priority of the neighboring cells serves as the order of priority of the other EMSs.

8. The method according to claim 5, wherein after sending the negotiation request to each of the other EMSs which manage the neighboring cells in broadcast mode, if receiving one or more negotiation results indicative of performing configuration adjustment, the method further comprises:
   obtaining, by the EMS which sends the negotiation request, current performance statistics of the BO of the EMS again;
   determining whether the performance statistics meet the negotiation conditions; and
   sending a report message to a network management system to report the current performance statistics of the BO of the EMS to the network management system, if the performance statistics meet the negotiation conditions.

9. The method according to claim 5, wherein after sending the negotiation request to the EMS of the highest priority, if a negotiation result indicative of rejecting configuration adjustment is received, or no negotiation result is returned within a set period, the method further comprises:
   selecting the next EMS according to the order of priority; and
   sending the negotiation request to the next EMS.

10. The method according to claim 9, wherein after receiving, by the EMS which sends the negotiation request, a negotiation result indicative of performing configuration adjustment, the method further comprises:
   obtaining, by the EMS that sends the negotiation request, current performance statistics of the managed BO of the EMS again;
   determining whether the performance statistics meet the negotiation conditions;
   selecting the next EMS according to the order of priority; and
   sending the negotiation request to the next EMS, if the performance statistics meet the negotiation conditions.

* * * * *